United States Patent
Xu et al.

(10) Patent No.: US 10,753,885 B2
(45) Date of Patent: Aug. 25, 2020

(54) FLOOR BOARD UNIT, FLOOR BOARD AND IOT HOME SYSTEM

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Yuanjie Xu, Beijing (CN); Yang Wang, Beijing (CN); Weiyun Huang, Beijing (CN); Tingliang Liu, Beijing (CN); Pengcheng Zang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 376 days.

(21) Appl. No.: 15/755,311

(22) PCT Filed: Aug. 9, 2017

(86) PCT No.: PCT/CN2017/096636
§ 371 (c)(1),
(2) Date: Feb. 26, 2018

(87) PCT Pub. No.: WO2018/099129
PCT Pub. Date: Jun. 7, 2018

(65) Prior Publication Data
US 2018/0306730 A1 Oct. 25, 2018

(30) Foreign Application Priority Data

Dec. 1, 2016 (CN) .................... 2016 2 1314531 U

(51) Int. Cl.
*G01N 21/94* (2006.01)
*H02N 2/18* (2006.01)
(Continued)

(52) U.S. Cl.
CPC ............. *G01N 21/94* (2013.01); *E04F 15/02* (2013.01); *E04F 15/107* (2013.01); *G01L 1/16* (2013.01);
(Continued)

(58) Field of Classification Search
None
See application file for complete search history.

(56) References Cited

U.S. PATENT DOCUMENTS 4,754,372 A 6/1988 Harrison
2011/0285296 A1* 11/2011 VanHerpen .......... D06N 7/0073
315/159
(Continued)

FOREIGN PATENT DOCUMENTS

CN 102575476 A 7/2012
CN 203034742 U 7/2013
(Continued)

OTHER PUBLICATIONS

International Search Report dated Nov. 15, 2017 in corresponding International Application No. PCT/CN2017/096636 along with an English translation of the International Search Report and an English translation of the Written Opinion of the International Searching Authority.

*Primary Examiner* — Elmito Breval
(74) *Attorney, Agent, or Firm* — Nath, Goldberg & Meyer; Joshua B. Goldberg

(57) ABSTRACT

The present application provides a floor board unit, a floor board and an IoT home system. The floor board unit includes a floor board body which can switch between a light-
(Continued)

transmissive state and a light-tight state, a floor board controller, a light emitting layer and at least one first sensor. The light emitting layer is below the floor board body. An output terminal of the first sensor is electrically coupled to an input terminal of the floor board controller. The light emitting layer is configured to emit incident light towards the floor board body. The floor board controller is configured to control the floor board body to be in the light-transmissive state when the light emitting layer emits the incident light. The first sensor receives reflected light obtained after the incident light is reflected and transmit a signal indicating an intensity of the reflected light to the floor board controller.

19 Claims, 4 Drawing Sheets

(51) Int. Cl.
| | |
|---|---|
| *G01V 8/20* | (2006.01) |
| *G01N 21/55* | (2014.01) |
| *G01N 21/88* | (2006.01) |
| *E04F 15/02* | (2006.01) |
| *G09G 3/38* | (2006.01) |
| *G09G 3/20* | (2006.01) |
| *H04L 12/28* | (2006.01) |
| *G01L 1/16* | (2006.01) |
| *H04L 29/08* | (2006.01) |
| *G01L 1/24* | (2006.01) |
| *G02F 1/157* | (2006.01) |
| *E04F 15/10* | (2006.01) |
| *G02F 1/163* | (2006.01) |

(52) U.S. Cl.
CPC .............. *G01L 1/247* (2013.01); *G01N 21/55* (2013.01); *G01N 21/8806* (2013.01); *G01V 8/20* (2013.01); *G02F 1/157* (2013.01); *G09G 3/2003* (2013.01); *G09G 3/38* (2013.01); *H02N 2/181* (2013.01); *H04L 12/282* (2013.01); *H04L 12/2823* (2013.01); *H04L 67/12* (2013.01); *E04F 2290/026* (2013.01); *G01N 2021/945* (2013.01); *G02F 1/163* (2013.01); *H02N 2/18* (2013.01)

(56) References Cited

U.S. PATENT DOCUMENTS

2011/0292641 A1* 12/2011 Van Herpen ........ F21V 23/0442
    362/153
2012/0201014 A1    8/2012 Van Herpen et al.

FOREIGN PATENT DOCUMENTS

| CN | 204703457 U | 10/2015 |
|---|---|---|
| CN | 204728626 U | 10/2015 |

* cited by examiner

US 10,753,885 B2

FLOOR BOARD UNIT, FLOOR BOARD AND IOT HOME SYSTEM

CROSS-REFERENCE TO RELATED APPLICATION

This is a National Phase Application filed under 35 U.S.C. 371 as a national stage of PCT/CN2017/096636, filed on Aug. 9, 2017, an application claiming the benefit of priority to Chinese Patent Application No. 201621314531.9 filed on Dec. 1, 2016, the contents of which are incorporated herein in their entirety by reference.

TECHNICAL FIELD

The present disclosure relates to the field of Internet of Things (IoT) technology, and particularly relates to a floor board unit, a floor board including the floor board unit, an IoT home system including the floor board.

BACKGROUND

In general, in the field of smart home, home-related facilities are generally integrated in conjunction with the IoT technology to build an efficient management system for residential facilities and family daily affairs. The so-called IoT is to use communication technology such as a local network or the Internet to connect sensors, controllers, machines, users, things and the like together in a new way, to form a network associating people with things, or things with things, thereby achieving informatization, remote management control and intelligence. Specifically, in the field of smart home, by taking a residence as a platform, integrated wiring technology, network communication technology, smart home—system design security technology, automatic control technology, and audio and video technology are used to integrate home-related facilities to build an efficient management system for residential facilities and family daily affairs, thereby improving home security, convenience, comfort, artistry, and achieving environment-friendly and energy-saving living environment.

SUMMARY

The present disclosure provides a floor board unit, a floor board including the floor board unit, and an Internet of Things (IoT) home system including the floor board.

A first aspect of the present disclosure relates to a floor board unit, including a floor board body capable of switching between a light-transmissive state and a light-tight state, a floor board controller, a light emitting layer and at least one first sensor, the light emitting layer is below the floor board body; an output terminal of the first sensor is electrically coupled to an input terminal of the floor board controller; the light emitting layer is configured to emit incident light towards the floor board body; the floor board controller is configured to control the floor board body to be in the light-transmissive state when the light emitting layer emits the incident light; the first sensor is configured to receive reflected light obtained after the incident light is reflected and transmit a signal indicating an intensity of the reflected light to the floor board controller.

Optionally, the light emitting layer includes a pressure-induced light emitting layer.

Optionally, the first sensor is provided at a side of the floor board unit, the floor board unit further includes at least one second sensor provided below the pressure-induced light emitting layer, the second sensor has an input terminal electrically coupled to the pressure-induced light emitting layer and an output terminal electrically coupled to the input terminal of the floor board controller, the second sensor is configured to transmit a lighting signal to the floor board controller upon receipt of the incident light emitted from the pressure-induced light emitting layer, and the floor board controller is configured to control the floor board body to be in the light-transmissive state upon receipt of the lighting signal.

Optionally, the floor board unit further includes at least one piezoelectric element electrically coupled to the floor board controller, and the floor board controller is further configured to determine a state of an object on the floor board body according to a magnitude of current generated by the piezoelectric element.

Optionally, the piezoelectric element and the second sensor are provided in a single layer.

Optionally, the floor board unit further includes a battery electrically coupled to the piezoelectric element and configured to supply power to the floor board unit.

Optionally, the floor board unit further includes a conductive layer configured to electrically couple a plurality of piezoelectric element, and the conductive layer is electrically coupled to the piezoelectric elements and the floor board controller.

Optionally, the conductive layer is between the piezoelectric elements and the light emitting layer.

Optionally, the light emitting layer includes at least one electroluminescent element electrically coupled to the floor board controller, and the floor board controller is further configured to control the electroluminescent element to emit the incident light.

Optionally, the floor board body includes a transparent surface layer and an electrochromic layer both electrically coupled to the floor board controller, and the floor board controller is configured to control the electrochromic layer to be in the light-transmissive state when the light emitting layer emits the incident light; or the floor board body includes a display panel, and the floor board controller is configured to control the display panel to be in the light-transmissive state when the light emitting layer emits the incident light.

A second aspect of the present disclosure relates to a floor board, including at least one floor board unit, each of which is any one of the above floor board units.

A third aspect of the present disclosure relates to an Internet of Things (IoT) home system, including the floor board having the above structure and a home control host electrically coupled to the floor board controller; wherein
the home control host is configured to:
receive floor board state information from the floor board controller and transmit an operation instruction to the floor board controller according to the floor board state information; and/or,
transmit an operation instruction to the floor board controller according to a user request.

Optionally, the IoT home system further includes a mobile terminal electrically coupled to the home control host and configured to:
receive the floor board state information from the home control host; and/or
receive a user request and transmit the user request to the home control host.

Optionally, the mobile terminal includes a floor board style selector, the floor board unit includes a display panel, an output terminal of the floor board style selector is coupled to a display signal input terminal of the display panel, the floor board style selector is configured to generate display signals corresponding to a plurality of predetermined images, and the display panel displays a corresponding predetermined image upon receipt of one of the display signals; or, the floor board unit includes an electrochromic layer, the output terminal of the floor board style selector is coupled to the electrochromic layer, the floor board style selector is configured to generate a plurality of different voltage signals, and the electrochromic layer presents, upon receipt of one of the voltage signals, a color corresponding to the voltage signal.

Optionally, the mobile terminal includes an indoor monitor configured to receive and monitor the floor board state information.

Optionally, the floor board unit is the floor board unit including the piezoelectric element, an input terminal of the indoor monitor is coupled to an output terminal of the piezoelectric element, and the indoor monitor is configured to receive a current generated by the piezoelectric element.

BRIEF DESCRIPTION OF THE DRAWINGS

The accompanying drawings, which serve to provide a further understanding of the present disclosure and constitute a part of this specification, are used for explaining the present disclosure together with the following specific implementations, rather than limiting the present disclosure. In the drawings.

DETAILED DESCRIPTION

Specific implementations of the present disclosure will be described in detail below in conjunction with the accompanying drawings. It should be understood that, the specific implementations described herein are merely used for describing and explaining the present disclosure, rather than limiting the present disclosure.

Inventors found that, an existing smart home management system often requires several hardware facilities, which results in low efficiency and high cost of the management system.

Therefore, the present disclosure aims to build a smart home system with high efficiency and low cost.

Figure 1:
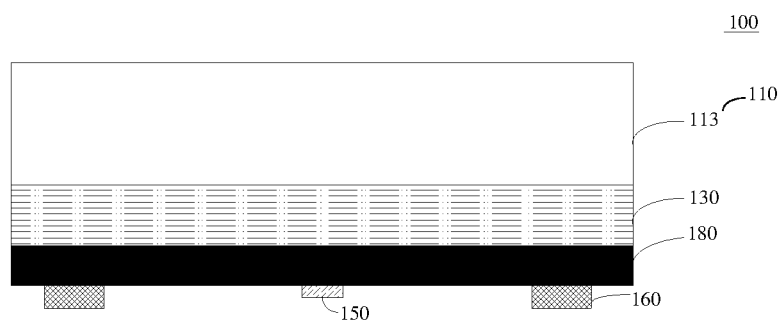
FIG. 1 is a schematic structure diagram of a floor board unit in a first embodiment.
Figure 2:
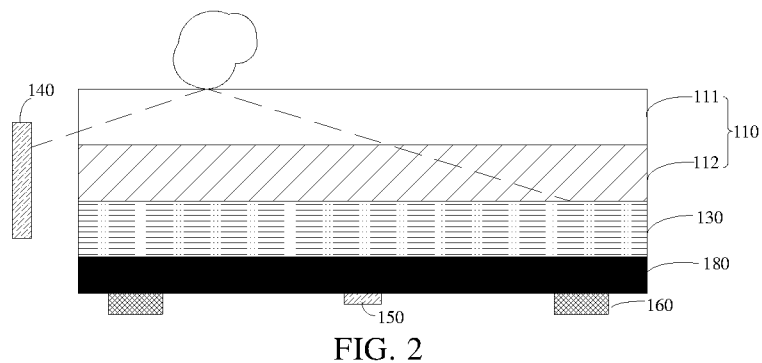
FIG. 2 is a schematic diagram illustrating principle of detecting contamination of a floor board unit in a second embodiment.
Figure 3:
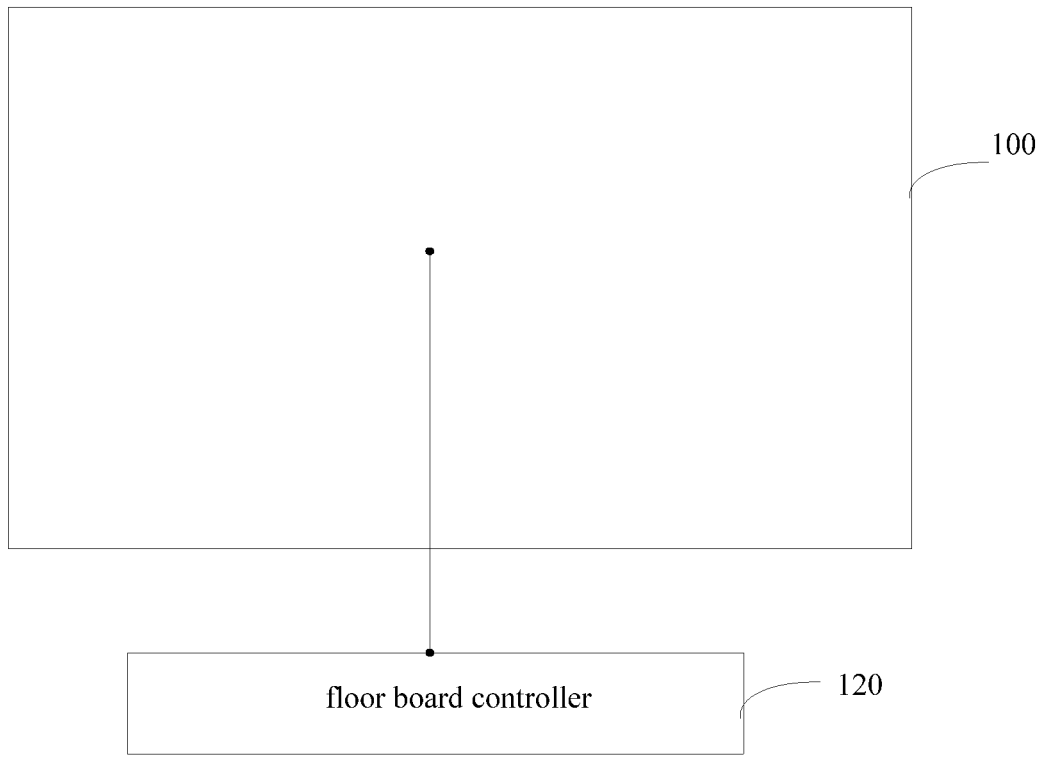
FIG. 3 is a schematic diagram of an overall structure of the floor board unit shown in FIG. 1.

Referring to FIGS. 1 to 3, a first aspect of the present disclosure relates to a floor board unit 100. The floor board unit 100 includes a floor board body 110, a floor board controller 120, a light emitting layer 130 and at least one first sensor 140.

The light emitting layer 130 may be located below the floor board body 110, and an output terminal of the first sensor 140 is electrically coupled to an input terminal of the floor board controller 120. The light emitting layer 130 is configured to emit incident light towards the floor board body 110, and the first sensor 140 is configured to receive reflected light obtained after the incident light is reflected, determine an intensity of the received reflected light and transmit a signal indicating the intensity of the reflected light to the floor board controller 120.

The floor board controller 120 is configured to control the floor board body 110 to be in a light-transmissive state when the light emitting layer 130 emits the incident light. The floor board body 110 in the present disclosure may be made of any material whose light transmission state can be controlled to change, as long as the floor board body can switch between the light-transmissive state and the light-tight state. The material and the working principle of the floor board body are not limited herein. In one embodiment, upon receipt of the signal (from the first sensor 140) indicating the intensity of the reflected light, contamination degree of the floor board body 110 may be determined according to the intensity of the reflected light.

The floor board unit 100 of the embodiment determines the contamination degree of the floor board body 110 in the following way.

When a user needs to determine whether the floor board unit 100 is contaminated or the contamination degree of the floor board unit 100, the light emitting layer 130 is controlled to emit light, and in the meanwhile, the floor board body 110 is in the light-transmissive state. When there is no contamination on a surface of the floor board body 110, the incident light emitted from the light emitting layer 130 will pass through and be refracted out of the floor board body 110, and only a small part of the incident light will be reflected to the first sensor 140 via the floor board body 110. In this case, the intensity of the reflected light received by the first sensor 140 is relatively small. On the contrary, referring to FIG. 2, in which there is contamination on the floor board body 110, and the dotted line in the figure represents a light traveling process. When the incident light reaches a contaminated spot, the spot may not allow the incident light to pass therethrough or may have a large refractivity (to result in total reflection of the incident light), and the incident light will not be refracted out, but reflected to the first sensor 140 via an upper surface of the floor board body 110. In this case, the intensity of the reflected light received by the first sensor 140 is greatly increased. Thus, the intensity of the reflected light received by the first sensor 140 is in direct proportion to the contamination degree of the floor board body 110. Upon receipt of the signal indicating the intensity of the reflected light from the first sensor 140, the floor board controller 120 can determine the contamination degree of the floor board body 110 according to the signal.

With the floor board unit 100 of the embodiment, a user may further choose whether or not to clean the floor board unit 100 according to the determined contamination degree. Intelligence is realized, and at the same time, the floor board unit 100 has a relatively simple structure.

It should be noted that the specific type of the first sensor 140 is not limited. Optionally, the first sensor 140 may be a light sensor, or needless to say, may be other sensor having a same function. Specific structure of the light emitting layer 130 is not limited either. As an optional structure, for example, the light emitting layer 130 may be made of a pressure-induced light emitting material. When a pressure is detected on the surface of the floor board body 110, the material is triggered to emit light, thus implementing the above process of determining the contamination degree of the floor board body 110. Needless to say, other structure or material that can emit light also falls into the scope of the present disclosure.

Figure 4:
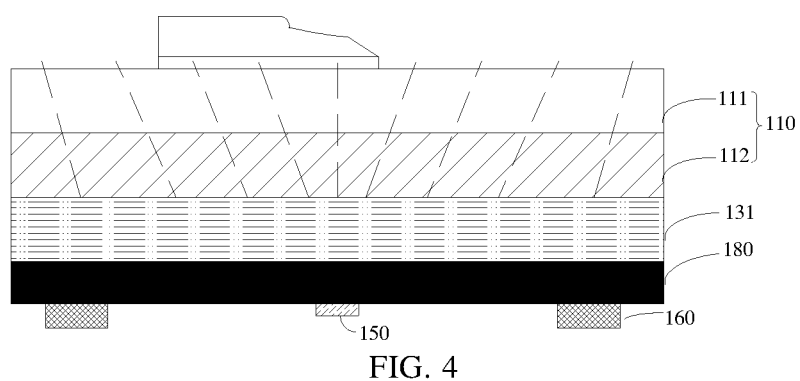
FIG. 4 is a schematic structure diagram illustrating that a pressure-induced light-emitting layer emits light under pressure in a third embodiment.

Optionally, referring to FIG. 4, dotted lines represent light paths, and top of the floor board body 110 indicates a surface of the floor board body 110 that a user steps on. The floor board unit 100 of the embodiment further includes at least one second sensor 150, and the light emitting layer 130 may include a presser-induced light emitting layer 131. An input terminal of the second sensor 150 is electrically coupled to the pressure-induced light emitting layer 131, and an output terminal of the second sensor 150 is electrically coupled to the input terminal of the floor board controller 120.

The second sensor 150 transmits a lighting signal to the floor board controller 120 upon receipt of the incident light emitted from the pressure-induced light emitting layer 131, and the floor board controller 120 controls the floor board body 110 to be in the light-transmissive state upon receipt of the lighting signal.

In the embodiment, a specific structure that can trigger the floor board body 110 to be in the light-transmissive state is implemented. When detecting that the pressure-induced light emitting layer 131 emits the incident light, the second sensor 150 transfers the signal to the floor board controller 120, and the floor board controller 120 controls the floor board body 110 to be in the light-transmissive state according to the received signal. In this way, the structure is simple.

It should be noted that the pressure-induced light emitting layer 131 of the embodiment can emit the incident light, as a basis for determining the contamination degree of the floor board body 110, when subjected to pressure. In addition, the pressure-induced light emitting layer 131 of the embodiment can also achieve the following function. When the user needs to move around at night, there is no need to turn on additional light, and by directly stepping on the floor board unit 100, the pressure-induced light emitting layer 131 below the floor board unit 100 emits light, thus achieving light emission on a track that the user has stepped on and illuminating the route.

Figure 5:
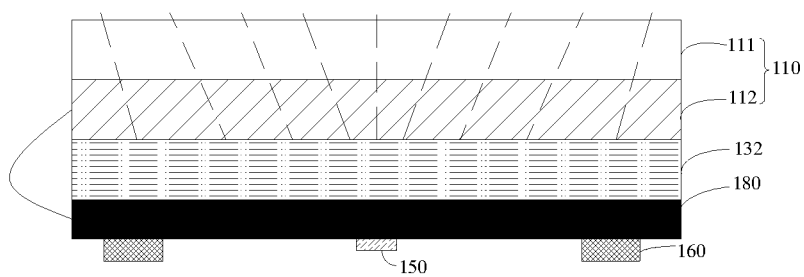
FIG. 5 is a schematic structure diagram illustrating that an electroluminescent element emits light in a fourth embodiment.

Optionally, referring to FIG. 5, dotted lines represent light paths, and top of the floor board body 110 indicates a surface of the floor board body 110 that a user steps on. As another structure of the light emitting layer 130, the light emitting layer 130 may include at least one electroluminescent element 132. The electroluminescent element 132 is electrically coupled to the floor board controller 120, and the floor board controller 120 is further configured to control the electroluminescent element 132 to emit the incident light.

In the embodiment, the pressure-induced light emitting layer 131 is replaced with the electroluminescent element 132. When the user needs to determine the contamination of the floor board unit 100, the electroluminescent element 132 may be driven by the floor board controller 120 to emit light, and further the contamination degree of the floor board body 110 is determined according to the intensity of the reflected light, thus further simplifying the structure.

Optionally, to make the structure of the floor board unit 100 more compact, the second sensor 150 may be provided below the pressure-induced light emitting layer 131, and the first sensor 140 may be provided at a side of the floor board unit 100.

It should be noted that, the first sensor 140 is provided at a side, which may be a side with respect to a length direction of the pressure-induced light emitting layer 131, of the floor board unit 100. This arrangement facilitates the first sensor 141 to receive the reflected light when the pressure-induced light emitting layer 131 emits the incident light.

Figure 6:
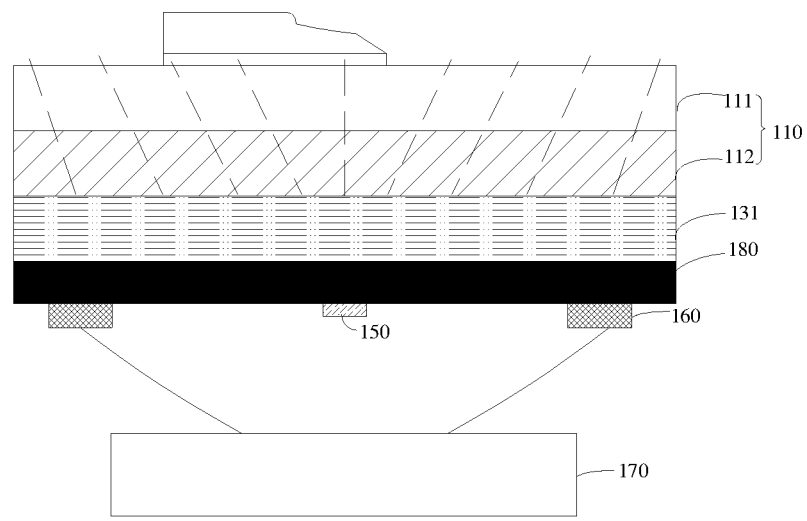
FIG. 6 is a schematic structure diagram illustrating that a pressure-induced light-emitting layer emits light and a piezoelectric element accumulates current under pressure in a fifth embodiment.

Optionally, referring to FIG. 6, the floor board unit 100 further includes at least one piezoelectric element 160. The piezoelectric element 160 is electrically coupled to the floor board controller 120. The piezoelectric element 160 is configured to generate a corresponding current when the floor board body 110 is subjected to a pressure, and different pressures correspond to different current values.

Accordingly, the floor board controller 120 may be further configured to determine a state of an object on the floor board body 110 according to a magnitude of current generated by the piezoelectric element 160.

In the embodiment, the current generated by the piezoelectric element 160 when the piezoelectric element 160 is subjected to a pressure can be effectively used. On the one hand, the generated current may be supplied to the floor board unit 100 for use. On the other hand, the generated current may be conducted to the floor board controller 120. The floor board controller 120 analyzes, according to the magnitude of the current, the state of the object on the floor board body 110, for example, information such as weight or pace of the user, and thus each user can be effectively identified.

Further, continuing referring to FIG. 6, in order to store electrical energy for use by the floor board unit 100, the floor board unit 100 further includes a battery 170. The battery 170 is electrically coupled to the piezoelectric element 160, the piezoelectric element 160 may charge the battery 170 and accumulate generated electric charges in the battery, so as to better supply power to the floor board unit 100.

Figure 7:
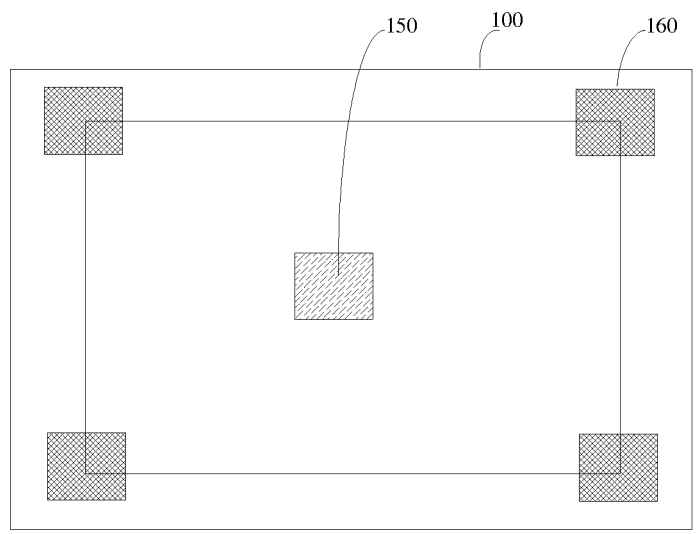
FIG. 7 is a plan view of the floor board unit shown in FIG. 1.

Optionally, in conjunction with FIG. 1 and referring to FIG. 7, in order to make the structure of the floor board unit 100 more compact, the piezoelectric element 160 and the second sensor 150 may be provided in a single layer. Needless to say, other arrangement may also be adopted.

Optionally, referring back to FIG. 1, in order to determine the state of the object on the floor board unit 100 more accurately, the floor board unit 100 further includes a conductive layer 180. The conductive layer 180 is electrically coupled to the piezoelectric element 160 and the floor board controller 120, and configured to electrically couple a plurality of piezoelectric elements 160, and optionally couple the plurality of piezoelectric elements 160 in series. On the one hand, by using the conductive layer 180, currents generated by all of the piezoelectric elements 160 in the floor board unit 100 may be conducted to the floor board controller 120, and the floor board controller 120 determines the state of the object on the floor board body 100 according to the current values. On the other hand, by using the conductive layer 180, the operation instruction issued by the floor board controller 120 can also be received and transmitted.

Optionally, referring to FIG. 1, in order to effectively accumulate the currents generated by the piezoelectric elements 160, the conductive layer 180 is located between the piezoelectric elements 160 and the light emitting layer 130.

Optionally, referring to FIGS. 4 and 5, as a structure of the floor board body 110 that can present the light-transmissive state, the floor board body 110 includes a transparent surface layer 111 and an electrochromic layer 112. Both of the transparent surface layer 111 and the electrochromic layer 112 are electrically coupled to the floor board controller 120.

When the contamination condition on the floor board body 110 needs to be detected, the electrochromic layer 112 may be driven to be in the light-transmissive state by the floor board controller 120. The structure is simple.

It should be noted that, the electrochromic layer 112 can not only allow the light emitted by the light emitting layer 130 to pass through the electrochromic layer 112, but also change floor board style of the floor board unit 100. For example, the entire electrochromic layer 112 may present a single pattern or color, or may present a plurality of patterns or colors, so that the floor board unit 100 shows a variety of styles.

Optionally, referring to FIG. 1, as another structure of the floor board body 110 that can present the light-transmissive state, the floor board body 110 includes a display panel 13.

Upon receipt of the lighting signal, the floor board controller 120 may control the display panel to be in the light-transmissive state. The floor board unit 100 having such a configuration has a simple structure and can effectively detect the contamination degree of the surface of the floor board body 110.

Figure 8:
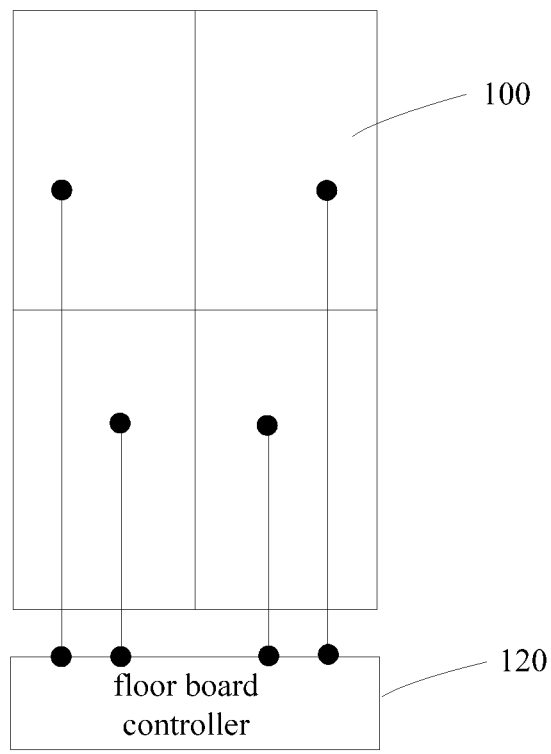
FIG. 8 is a schematic structure diagram of a floor board in the first embodiment.

A second aspect of the present disclosure relates to a floor board 200. Referring to FIG. 8, the floor board 200 includes at least one floor board unit 100 having any one of the above structures.

The present embodiment is a specific application of the above floor board unit 100. As shown in FIG. 8, all of the floor board units 100 may share one floor board controller 120. When the user decorates a house, in order to realize intelligence, the floor board unit 100 having the above structure may be adopted. The floor board unit 100 having the above structure can not only detect the contamination degree of the floor board 200 effectively, but also detect the person inside the house, incoming person from an abnormal entrance, etc. In this way, an intelligent home system is achieved.

Figure 9:
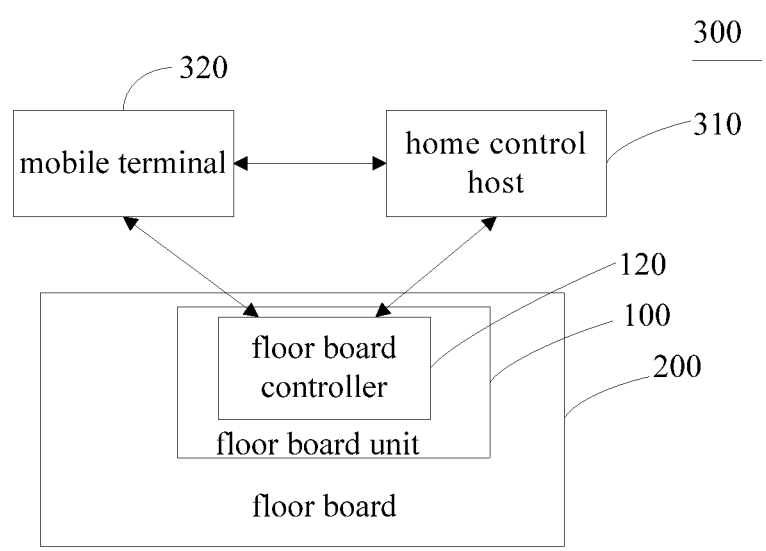
FIG. 9 is a block diagram of an IoT home system in the first embodiment.

Referring to FIG. 9, a third aspect of the present disclosure relates to an Internet of Things (IoT) home system 300. The IoT system 300 includes the above floor board 200.

In the present embodiment, the above floor board 200 is connected to an Internet of Things, and the state of the object on the floor board 200 can be monitored in real time, which is more intelligent.

Optionally, the IoT system 300 further includes a home control host 310. The home control host 310 is electrically coupled to the floor board controller 120.

The home control host 310 is configured to receive floor board state information from the floor board controller 120 and transmit an operation instruction to the floor board controller 120 according to the floor board state information.

Needless to say, the home control host 310 may also transmit an operation instruction to the floor board controller 120 according to a user request.

By using the IoT technology, the floor board 200 achieves communication connection with a local area network or Internet, can monitor the information of the floor board 200 in real time, without other hardware facilities, and can effectively determine the situation inside the house, e.g., contamination condition, personnel, etc. Besides, a corresponding operation instruction can be issued according to the monitored information or an operation instruction can be issued according to a user request, for example, to change the floor board style, and accordingly, the floor board controller 120 will drive the electrochromic layer 112 to change the floor board style. The floor board 200 has a simple structure and can achieve efficient monitoring.

Optionally, the IoT home system 300 further includes a mobile terminal 320. The mobile terminal 320 is electrically coupled to the home control host 310.

The mobile terminal 320 is configured to receive the floor board state information from the home control host 310. Needless to say, the mobile terminal 320 may also configured to receive a user request and transmit the user request to the home control host 310.

The mobile terminal 320 includes, but is not limited to, a mobile phone, a tablet or a computer.

In the embodiment, the mobile terminal may push the floor board state information to the user for the user to view the current floor board state information, or may receive a user request and transmit the user request to the home control host 310 so that the home control host 310 issues a corresponding operation instruction that controls the floor board control mobile 120 to execute the corresponding operation instruction, thus achieving intelligence. In addition, the IoT home system 300 does not need other hardware facilities to detect the situation in the house, which can effectively reduce the cost of a traditional smart home system.

Optionally, the mobile terminal 320 includes a floor board style selector. In a case where the floor board unit includes the display panel, an output terminal of the floor board style selector is coupled to a display signal input terminal of the display panel, the floor board style selector is configured to generate display signals corresponding to a plurality of predetermined images, and the display panel displays a corresponding predetermined image upon receipt of one of the display signals.

In a case where the floor board unit includes the electrochromic layer, the output terminal of the floor board style selector is coupled to the electrochromic layer, the floor board style selector is configured to generate a plurality of different voltage signals, and the electrochromic layer presents, upon receipt of one of the voltage signals, a color corresponding to the voltage signal.

With the IoT home system provided in the present disclosure, the user can change the floor board style through the floor board style selector without changing the floor board unit, thus reducing decoration cost of the user.

Optionally, the mobile terminal may further include an indoor monitor configured to receive and monitor the floor board state information to determine the indoor situation. Specifically, the indoor monitor is configured to:

determine, based on the intensity of the received reflected light, indoor cleanliness including indoor cleanliness at different locations, and output monitoring results at different locations according to the levels of cleanliness.

Specifically, for example, cleanliness at master bedroom, second bedroom, kitchen, balcony and living room in a house is determined according to the intensity of the reflected light. When a place is seriously contaminated, a red signal indicating that the place needs timely cleaning may be output. When a place is slightly contaminated, a blue signal indicating that the place can be cleaned now or after a period of time may be output. When a place is not contaminated, a green signal may be output, or no prompt is output.

Indoor air condition is determined based on the received detection signal of the second sensor 150.

Specifically, the second sensor 150 may be a PM2.5 (Particulate Matter 2.5) sensor, which can monitor indoor PM2.5 condition. When a value of PM2.5 index exceeds a preset value (e.g., 187), surface PM2.5 is excessive. Needless to say, the second sensor 150 may also be a sensor having other structure and configured to monitor other condition of the indoor air, such as indoor gas concentration content, etc.

When the floor board unit includes the piezoelectric element, the input terminal of the indoor monitor is coupled to an output terminal of the piezoelectric element to receive the current generated by the piezoelectric element, and the indoor monitor is configured to determine, based on a position of the indoor floor board where the current is generated, one or more of:

statistics of indoor personnel, including personnel at a default entry and a non-default entry, weights of indoor personnel and movement tracks of indoor personnel, wherein an alarm signal is output in a case of a person at the non-default entry or having an abnormal weight;

statistics of indoor activities, including movement distances of indoor personnel and residence times of indoor personnel at current positions.

The above can be determined according to the magnitude and position of the current generated by the piezoelectric element 160 and the formed current trajectory.

It could be understood that the above implementations are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

The invention claimed is:

1. A floor board unit, comprising a floor board body capable of switching between a light-transmissive state and a light-tight state, a floor board controller, a light emitting layer and at least one first sensor, wherein the light emitting layer is below the floor board body; an output terminal of the first sensor is electrically coupled to an input terminal of the floor board controller; the light emitting layer is configured to emit incident light towards the floor board body; the floor board controller is configured to control the floor board body to be in the light-transmissive state when the light emitting layer emits the incident light; and the first sensor is configured to receive reflected light obtained after the incident light is reflected and transmit a signal indicating an intensity of the reflected light to the floor board controller.

2. The floor board unit of claim 1, wherein the floor board unit is configured to control the light emitting layer to present a particular pattern and/or color according to a received floor board style selection signal.

3. The floor board unit of claim 1, wherein the light emitting layer comprises a pressure-induced light emitting layer.

4. The floor board unit of claim 3, wherein the first sensor is provided at a side of the floor board unit, the floor board unit further comprises at least one second sensor provided below the pressure-induced light emitting layer, the second sensor has an input terminal electrically coupled to the pressure-induced light emitting layer and an output terminal electrically coupled to the input terminal of the floor board controller, the second sensor is configured to transmit a lighting signal to the floor board controller upon receipt of the incident light emitted from the pressure-induced light emitting layer, and the floor board controller is configured to control the floor board body to be in the light-transmissive state upon receipt of the lighting signal.

5. The floor board unit of claim 4, further comprising at least one piezoelectric element electrically coupled to the floor board controller, wherein the floor board controller is further configured to determine a state of an object on the floor board body according to a magnitude of current generated by the piezoelectric element.

6. The floor board unit of claim 5, wherein the piezoelectric element and the second sensor are provided in a single layer.

7. The floor board unit of claim 5, further comprising a battery electrically coupled to the piezoelectric element and configured to accumulate electric charges generated by the piezoelectric element.

8. The floor board unit of claim 5, further comprising a conductive layer configured to electrically couple a plurality of piezoelectric elements, wherein the conductive layer is electrically coupled to the piezoelectric elements and the floor board controller.

9. The floor board unit of claim 8, wherein the conductive layer is between the piezoelectric elements and the light emitting layer.

10. The floor board unit of claim 1, wherein the light emitting layer comprises at least one electroluminescent element electrically coupled to the floor board controller, and the floor board controller is further configured to control the electroluminescent element to emit the incident light.

11. The floor board unit of claim 1, wherein the floor board body comprises a transparent surface layer and an electrochromic layer both electrically coupled to the floor board controller, and the floor board controller is configured to control the electrochromic layer to be in the light-transmissive state when the light emitting layer emits the incident light.

12. The floor board unit of claim 1, wherein the floor board body comprises a display panel, and the floor board controller is configured to control the display panel to be in the light-transmissive state when the light emitting layer emits the incident light.

13. A floor board, comprising at least one floor board unit of claim 1.

14. An Internet of Things (IoT) home system, comprising the floor board of claim 13 and a home control host electrically coupled to the floor board controller; wherein the home control host is configured to:
receive floor board state information from the floor board controller and transmit an operation instruction to the floor board controller according to the floor board state information; and/or,
transmit an operation instruction to the floor board controller according to a user request.

15. The IoT home system of claim 14, further comprising a mobile terminal electrically coupled to the home control host and configured to:
receive the floor board state information from the home control host; and/or
receive a user request and transmit the user request to the home control host.

16. The IoT home system of claim 15, wherein the mobile terminal comprises a floor board style selector,
floor board controller is configured to control the display panel to be in the light-transmissive state when the light emitting layer emits the incident light,
an output terminal of the floor board style selector is coupled to a display signal input terminal of the display panel, the floor board style selector is configured to generate display signals corresponding to a plurality of predetermined images, and the display panel displays a corresponding predetermined image upon receipt of one of the display signals.

17. The IoT home system of claim 15, wherein the mobile terminal comprises a floor board style selector, the floor board body comprises a transparent surface layer and an electrochromic layer both electrically coupled to the floor board controller, and the floor board controller is configured to control the electrochromic layer to be in the light-transmissive state when the light emitting layer emits the incident light, the output terminal of the floor board style selector is coupled to the electrochromic layer, the floor board style selector is configured to generate a plurality of different voltage signals, and the electrochromic layer presents, upon receipt of one of the voltage signals, a color corresponding to the voltage signal.

18. The IoT home system of claim 15, wherein the mobile terminal comprises an indoor monitor configured to receive and monitor the floor board state information.

19. The IoT home system of claim 18, wherein the floor board unit further comprises at least one piezoelectric element, an input terminal of the indoor monitor is coupled to an output terminal of the piezoelectric element, and the indoor monitor is configured to receive a current generated by the piezoelectric element.

* * * * *